May 22, 1923.

F. J. NASH 1,456,332

PROCESS OF DRYING AND PREPARING FERTILIZING MATERIALS.

Original Filed April 26, 1916

Inventor
Frederic J. Nash
By his Attorneys
Ogden & Shelden

Patented May 22, 1923.

1,456,332

UNITED STATES PATENT OFFICE.

FREDERIC J. NASH, OF BROOKLYN, NEW YORK.

PROCESS OF DRYING AND PREPARING FERTILIZING MATERIALS.

Application filed April 26, 1916, Serial No. 93,772. Renewed October 27, 1922. Serial No. 597,405.

*To all whom it may concern:*

Be it known that I, FREDERIC J. NASH, a citizen of the United States, and a resident of the borough of Brooklyn, county of Kings, city and State of New York, have invented certain new and useful Improvements in Processes of Drying and Preparing Fertilizing Materials, of which the following is a specification accompanied by drawings.

This invention relates to a process of drying, more particularly for drying peat, or peat and ocean vegetation, although the process can be used for drying any materials for which it may be suitable. In my Patent No. 1,228,587, granted June 5, 1917 on an application, Ser. No. 80,097, filed February 24, 1916, I have described a method of making a fertilizer from peat and ocean vegetation, and my improved drying process is especially designed to be used in the manufacture of that fertilizer.

Peat when taken out of the peat deposits is cold, sour and antiseptic. It has no value in that condition as a fertilizer. Many months or perhaps a year is ordinarily required to dry and ripen peat and make it fit as a fertilizer for the soil, by the usual weathering or air drying process, which consists of stacking the peat with horse manure outdoors, and letting the stack dry and ripen under atmospheric conditions.

Peat is so extremely retentive of water that it cannot be made to entirely give up its water by pressure.

My improved process for drying peat will reduce the drying and ripening process to a matter of hours, instead of months or a year, and in this way the peat may be made immediately available for use as an ingredient of my improved fertilizer, as described in said copending application and for other uses.

Figure 1:
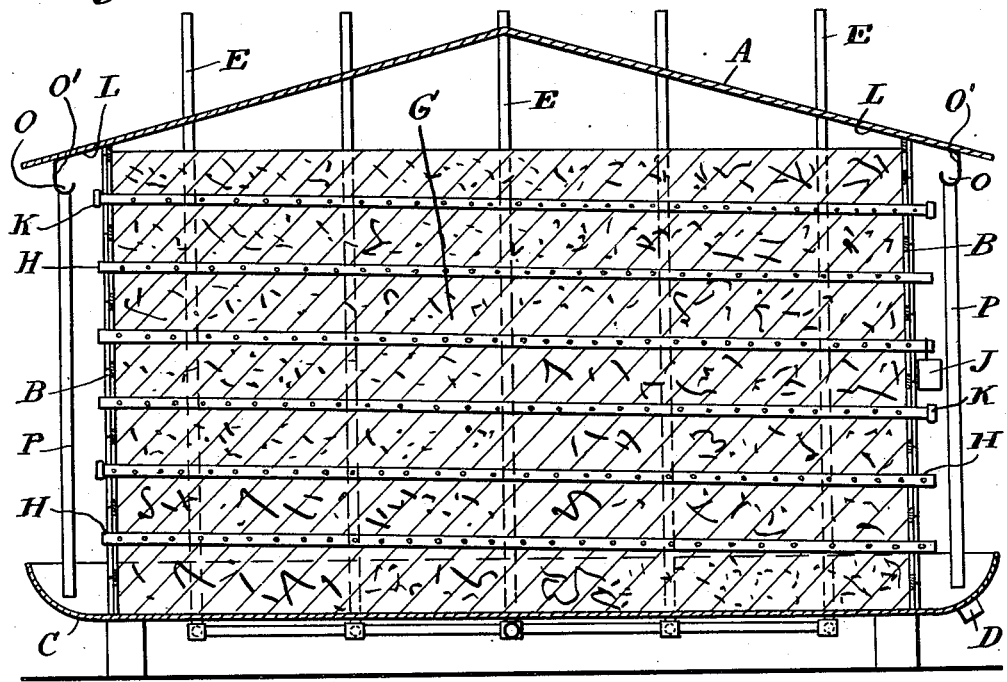
Figure 2:
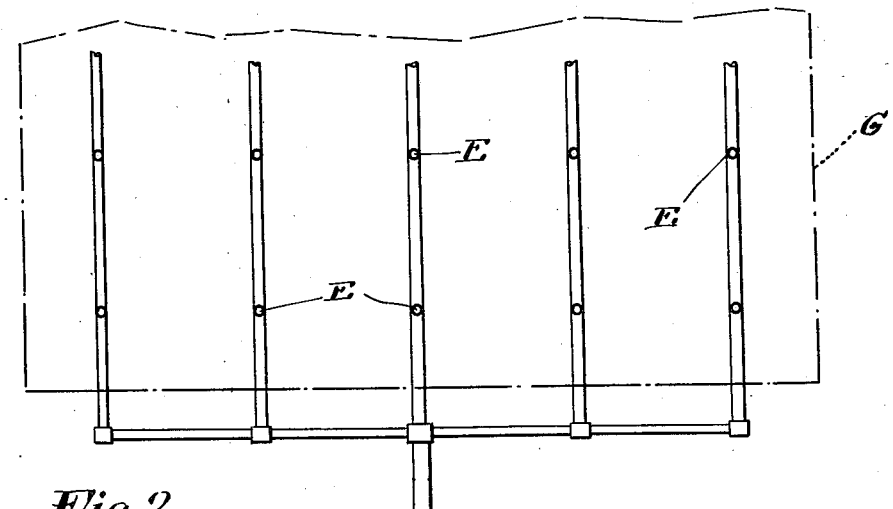

The preferred form of apparatus for carrying out the process is shown in the accompanying drawings, in which Fig. 1 is a side elevation, partly in vertical section, showing the drying apparatus, and Fig. 2 is a diagrammatic plan view showing the arrangement of the heating pipes.

Referring to the drawings, a suitable house or shed is provided, having the roof A, the latticed or slatted sides and ends B, and a bottom of any suitable material in the form of a trough C, having an outlet pipe D to carry off and collect the drainage and condensation products.

The material to be dried is stacked within the drying house, and heat is supplied to the stack, preferably internally, by suitable means, as for instance, the heating pipes E, which preferably extend vertically through the stack and project through the roof A. These pipes E are connected in any suitable manner to a heater F for supplying heat to the stack.

If peat alone is to be dried, the stack is built up as shown in Figure 1 in layers G, and in the course of forming the stack, provision is made for lateral air circulation, as by means of the perforated air circulation pipes H, which are adapted to be laid substantially horizontally in rows in each layer of peat. These horizontal pipes are open at the ends, in order to permit free circulation of air therethrough for the purpose of hastening the evaporation of the moisture in the first stages as it is driven off by the heat. The air circulation for drying thus passes through the center of the stack. As the drying house will be located outdoors, preferably near the peat bed, there will be a strong natural circulation of air through the horizontal air circulation pipes, without the necessity of creating an artificial draft and in this way the extra expense of auxiliary blowing apparatus is saved.

The air circulation pipes are preferably perforated, as shown, in order to permit contact of the air with the material itself and also in order to collect some moisture throughout the stack and permit the liquid to run out the ends of the pipes. The collecting and saving of this liquid is of great importance when the stack consists of alternate layers of peat and sea vegetation, because the liquid will contain a material percentage of potash given up by the sea vegetation, the remainder being absorbed by the peat as it dries, or collecting in the bottom trough C. If desired, pails J may be hung over the ends of the pipes to collect the liquid. The liquid may be suitably evaporated in order to retain the potash for use.

The air circulation pipes are preferably provided with removable caps K which may be applied as required when it is desired to shut off the air draft from some or all of the pipes. The roof A is preferably provided with a metallic lining L which is provided with depending lips O', having inwardly turned troughs or gutters O at the lower end of each lip, and these gutters are connected by pipes or leaders P to the bottom trough C, so that the liquid condensing on the inside of the roof will run into the gutters and thence be conducted to the bottom trough C and collected.

The upright heating pipes E should be arranged at intervals sufficiently close together, as shown in Figure 2, to cause the heat to permeate substantially all parts of the stack and thoroughly dry out all of the material. The slatted sides and ends of the drying house are to afford additional circulation of air and a suitable door or doors should also be provided for filling and removing purposes.

In carrying out the preferred process in the case of peat, the stack is heated to a sufficient degree to cause it to sweat, but the heat should not be high enough to burn the material being dried. The air is allowed to circulate through the horizontal pipes, and this first stage is completed when substantially one-half of the water or liquid in the material is eliminated. Then the air circulation through the horizontal pipes is shut off by putting the caps on the pipes, and the process is continued until the material is dried to a sufficient degree. In the second stage, by shutting off the air circulation, the sweating of the peat causes it to release its ingredients valuable as fertilizers and become fit for use. It also renders the ingredients available which decompose the minerals in the soil. The caps may be taken off and put on at will, according to the condition of the stack. Substantially the same process is carried out when the stack consists of alternate layers of ocean vegetation and peat. The process of making the fertilizer is completed when the stack is sufficiently dried. The manufactured product made from ocean vegetation and peat will then contain potash, nitrogen, phosphoric acid and the two humoi, that is, the humus of peat and the humus of ocean vegetation and other organic substances.

The seaweed with its cellular construction melts at once into the ground. The fibrous peat gives way gradually. It cannot be washed out of soil nor can it be burned out by the tropic sun. These humoi as well as other organic substances containing great stores of carbonic acid will release phosphoric acid and potash from any minerals in the soil which contain them, whenever or wherever the humoi may be applied to them. The dried peat may also be used for fuel, as for instance, to furnish power for producing the heat required and for conveying machinery for handling the peat or materials to be dried. The peat, sea vegetation, or other organic material to be dried may, if desired, be cut up or otherwise reduced to small sized pieces, before being placed in the drying house, or else the material may be granulated or divided after having been dried. In order to increase the content of potash in the final product, under some circumstances, any suitable material, preferably in ground condition, containing potash, may be added to the stack.

I claim and desire to obtain by Letters Patent the following:

1. The process of drying peat, which consists in forming the peat into a stack of suitable shape, applying heat internally to the stack, while allowing air to circulate through the body of the stack, then shutting off the said air circulation, and continuing to apply heat to the stack until the drying is completed.

2. The process of making a fertilizer, which consists in forming a stack of suitable shape composed of layers of peat and organic material containing potash, applying heat internally to the stack, while allowing air to circulate through the body of the stack, then shutting off the air circulation, and continuing to apply heat to the stack until the peat is decomposed and the process of making the fertilizer is completed.

3. The process of drying organic matter, which consists in separating or dividing the material to be dried into relatively small sized pieces, forming a stack of suitable shape of said pieces, applying heat internally to the stack, while allowing air to circulate through the body of the stack, then shutting off the air circulation, and continuing to apply heat to the stack until the stack is dried and the process of making the fertilizer is completed.

4. The process of making a fertilizer of peat and organic material containing potash which consists in separating or dividing the material to be treated into relatively small sized pieces, forming a stack of suitable shape of said pieces, adding potash containing material to said stack, applying heat internally to the stack, while allowing air to circulate through the body of the stack, then shutting off the air circulation, and continuing to apply heat to the stack until the stack is dried and the process of making the fertilizer is completed.

5. The process of making a fertilizer composed of peat and organic material of the nature of sea-vegetation containing potash, which consists in forming a stack of alternate layers of peat and organic matter, applying heat internally to the stack, while allowing air to circulate through the stack, draining off water from the interior of the stack while the air is being allowed to circulate in the interior thereof, then shutting off the air circulation and continuing to apply heat until the stack is dried and the process of making the fertilizer completed.

6. The process of making a fertilizer composed of peat and organic material of the nature of sea-vegetation containing potash which consists in forming a stack of alternate layers of peat and organic matter, applying heat internally to the stack at a plurality of points, while allowing air to circulate through the stack, draining off water from the interior of the stack at a plurality of points, while the air is being allowed to circulate in the interior thereof, then shutting off the air circulation and continuing to apply heat until the stack is dried and the process of making the fertilizer completed.

7. The process of making a fertilizer which consists in forming a stack of suitable shape, composed of layers of peat and organic material of the nature of sea-vegetation containing potash, applying heat internally to the stack, while allowing air to circulate through the body of the stack until the stack is dried and the process of making the fertilizer is completed.

8. The process of making a fertilizer composed of peat and organic material of the nature of sea-vegetation containing potash, which consists in forming a stack of alternate layers of peat and organic matter, applying heat internally to the stack while allowing air to circulate through the stack, draining off water from the interior of the stack while the air is being allowed to circulate in the interior thereof, and continuing to apply heat until the stack is dried and the process of making the fertilizer completed.

9. The process of making a fertilizer composed of peat and organic material of the nature of seat-vegetation containing potash, which consists in dividing the material to be treated into relatively small sized pieces, forming a stack of suitable shape of said pieces, adding potash containing material to said stack, allowing air to circulate through the body of the stack and applying heat internally to the stack until the stack is dried and the process of making the fertilizer is completed.

10. The process of making a fertilizer which consists in forming a stack of suitable shape, composed of layers of peat and organic material containing potash, applying heat internally to the stack, while allowing air to circulate through the body of the stack until the stack is dried and the process of making the fertilizer is completed.

11. The process of making a fertilizer which consists in forming a stack of suitable shape, composed of layers of peat and sea-vegetation, applying heat internally to the stack until the stack is dried and the process of making the fertilizer is completed.

In testimony whereof I have signed this specification in the presence of two subscribing witnesses.

FREDERIC J. NASH.

Witnesses:
A. C. PARHAM,
M. M. RIEMANN.